United States Patent
Deng

(10) Patent No.: US 9,883,677 B2
(45) Date of Patent: Feb. 6, 2018

(54) DOUGH KNEADING MACHINE

(71) Applicant: Housoen Electric Manufacture Co., Ltd., Jiangmen, Guangdong (CN)

(72) Inventor: Yaotian Deng, Guangdong (CN)

(73) Assignee: Housoen Electric Manufacture Co., Ltd., Jiangmen (CN)

( * ) Notice: Subject to any disclaimer, the term of this patent is extended or adjusted under 35 U.S.C. 154(b) by 39 days.

(21) Appl. No.: 15/153,885

(22) Filed: May 13, 2016

(65) Prior Publication Data
US 2017/0112145 A1  Apr. 27, 2017

(30) Foreign Application Priority Data
Oct. 27, 2015  (CN) .......................... 2015 1 0712734

(51) Int. Cl.
*A21C 1/14* (2006.01)
*A21C 1/02* (2006.01)
*B01F 7/00* (2006.01)

(52) U.S. Cl.
CPC .............. *A21C 1/02* (2013.01); *A21C 1/1405* (2013.01); *A21C 1/1465* (2013.01); *B01F 7/00208* (2013.01); *B01F 7/00325* (2013.01)

(58) Field of Classification Search
CPC ...................................................... A21C 1/02
USPC .......................................... 366/98, 205, 314
See application file for complete search history.

(56) References Cited

U.S. PATENT DOCUMENTS

| 824,058 | A | * | 6/1906 | Bain | ...................... | B65D 88/68 |
| | | | | | | 222/241 |
| 978,372 | A | * | 12/1910 | Hayne et al. | ............ | A21C 1/02 |
| | | | | | | 366/98 |
| 2,858,861 | A | * | 11/1958 | Appleton | ................ | A47J 43/06 |
| | | | | | | 366/205 |

\* cited by examiner

*Primary Examiner* — David Sorkin

(57) ABSTRACT

The invention discloses a dough kneading machine, including a main body on which a dough kneading component is mounted; the dough kneading component comprises a dough kneading bowl with a cover, in which a dough kneading drive shaft is set passing through a mounting hole on the bottom of the bowl and connecting to the main body at the lower end; a bidirectional dough kneading hook with a center shaft is mounted on the upper end of the dough kneading drive shaft; a first dough kneading hook and a second dough kneading hook with asymmetric structure are oppositely set on the center shaft and a center scraper is connected to the bottom of the center shaft. The dough kneading machine effectively ensures the stationarity during rotation operation of food processing, and the efficiency is two times as fast as that of unidirectional dough kneading hook.

7 Claims, 2 Drawing Sheets

DOUGH KNEADING MACHINE

CROSS-REFERENCE TO RELATED APPLICATIONS

The present application claims the benefit of Chinese Patent Application No. 201510712734.7 filed on Oct. 27, 2015, the contents of which are hereby incorporated by reference.

FIELD OF THE INVENTION

The invention relates to a food processing machine, particularly to a dough kneading machine.

DESCRIPTION OF THE RELATED ART

Dough kneading machine is a supporting machine for wheaten food processing. Firstly, put the dry flour into the mixing drum of the dough kneading machine, and then add appropriate amount of water into the dry flour; the shaft on the dough kneading mechanism drives the dough kneading hook to rotate and mix the flour and water into dough for kneading. The common dough kneading machine comprises a main body, in which a drive motor is set; a reduction gear is connected to the lower end of the drive motor and a dough kneading component is connected to the output end of the reduction gear. In prior art, the function of flour stirring and kneading is realized through the rotation of a unidirectional dough kneading hook, which is set in the dough kneading component. However, in actual use, the dough will move with the dough kneading hook and the entire machine will vibrate and shake drastically under the unbalanced force of the unidirectional dough kneading hook, thus the efficiency of dough kneading is lowered.

SUMMARY OF THE INVENTION

The technical problem to be solved by the invention is to provide a dough kneading machine to reduce the vibration during dough kneading and improve the efficiency of dough kneading.

In order to solve the above problem, the dough kneading machine disclosed by the invention is provided with a main body on which a dough kneading component is mounted; the dough kneading component comprises a dough kneading bowl with a cover, in which a dough kneading drive shaft is set passing through a mounting hole on the bottom of the bowl and connecting to the main body at the lower end. A bidirectional dough kneading hook with a center shaft is mounted on the upper end of the dough kneading drive shaft. A first dough kneading hook and a second dough kneading hook with asymmetric structure are oppositely set on the center shaft and a center scraper is connected to the bottom of the center shaft.

A horizontally-mounted motor is set inside the main body; a worm is connected to the motor through a belt reducing mechanism; the worm is engaged with a reversing worm gear; a vertical drive shaft is set on the main body, connecting to the reversing worm gear at the lower end and connecting to the dough kneading component at the upper end.

The main body comprises a base and an upper end cover; a reduction gearbox support is set on the bottom of the upper end cover; the motor, belt reducing mechanism and worm are all mounted in the reduction gearbox support.

A first drive shaft is connected to the lower end of the dough kneading drive shaft and a second drive shaft is connected to the upper end of the vertical drive shaft; a first drive gear and a second drive gear that are fit to each other are set in the first drive shaft and second drive shaft respectively; an external gear ring is set on the outer side of the first drive shaft; an internal gear ring matched with the external gear ring is set on the inner side of the second drive shaft.

A positioning lug for fitting to the bidirectional dough kneading hook is set on the upper side of the dough kneading drive shaft.

The bowl cover has an opening in the middle and a center cover is mounted in the opening. A balancing weight is set in the base.

The beneficial effect of the invention is that: the dough kneading machine uses a bidirectional dough kneading hook with asymmetric structure to effectively ensure the stationarity during rotation in food processing operation and prevent the machine shaking caused by the unidirectional dough kneading hook. The efficiency is 2 times as fast as that of unidirectional dough kneading hook and thus the efficiency of dough kneading is increased. Moreover, the bidirectional dough kneading hook has a center scraper, preventing the dough from sticking to the middle in a lump during food processing and thus ensuring the food to be processed completely.

BRIEF DESCRIPTION OF THE DRAWINGS

The invention is further described in combination with Drawings and Embodiments as follows.

DETAILED DESCRIPTION OF THE PREFERRED EMBODIMENTS

Figure 1:
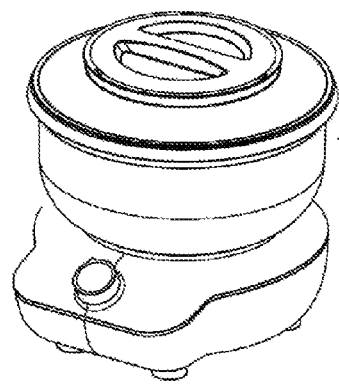
FIG. 1 is a structural diagram of the invention.
Figure 2:
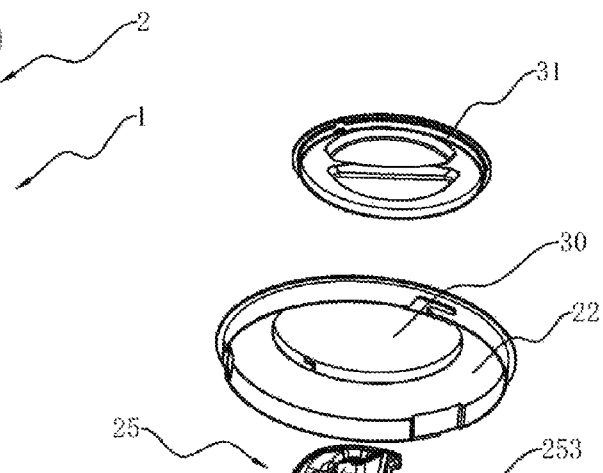
FIG. 2 is a breakdown structure diagram of the dough kneading component.

Refer to FIGS. 1 and 2, a dough kneading machine disclosed by the invention comprises a main body 1 on which a dough kneading component 2 is mounted, wherein, the dough kneading component 2 comprises a dough kneading bowl 21 with a cover 22, in which a dough kneading drive shaft 23 is set passing through a mounting hole 24 on the bottom of the bowl 21 and connecting to the main body 1 at the lower end; a bidirectional dough kneading hook 25 with a center shaft 251 is mounted on the upper end of the dough kneading drive shaft 23; a first dough kneading hook 252 and a second dough kneading hook 253 with asymmetric structure are oppositely set on the center shaft 251 and a center scraper 254 is connected to the bottom of the center shaft 251. The dough kneading machine uses a bidirectional dough kneading hook with asymmetric structure to effectively ensure the stationarity during rotation of food processing operation and prevent the machine shaking caused by the unidirectional dough kneading hook. The efficiency is two times as fast as that of unidirectional dough kneading hook and thus the efficiency of dough kneading is increased. Moreover, the bidirectional dough kneading hook has a center scraper 254, preventing the dough from sticking to the middle in a lump during food processing and thus ensuring the food to be processed completely. The structure of the center scraper 254 in combination with the bidirectional dough kneading hook 25 increases the processing area for dough kneading, improves the working efficiency and increases the effective amount of dough kneading at the same time.

Wherein, a positioning lug 29 for fitting to the bidirectional dough kneading hook 25 is set on the upper side of the dough kneading drive shaft 23, which makes the installation and removal of the bidirectional dough kneading hook 25 easier, thus decreases the difficulty of structure processing. The bowl cover 22 has an opening 30 in the middle and a center cover 31 is mounted in the opening 30. The auxiliary food materials can be added through the opening 30 of the bowl cover when the center cover 31 is removed, thus the current operation problem due to small charging opening is solved.

Figure 3:
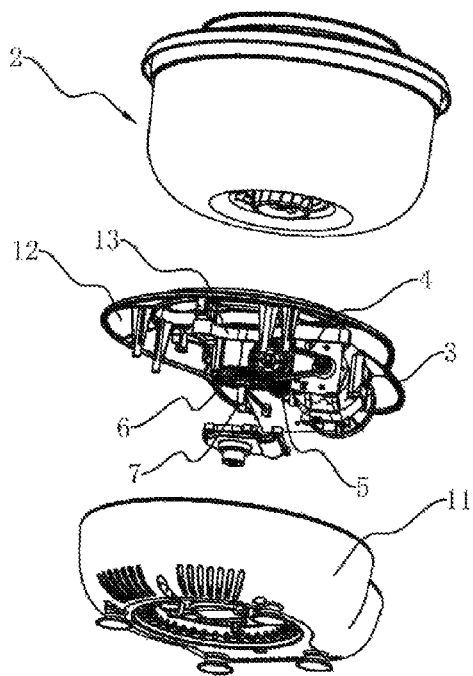
FIG. 3 is a breakdown structure diagram of the invention.

Refer to FIG. 3, a horizontally-mounted motor 3 is set inside the main body 1; a worm 5 is connected to the motor 3 through a belt reducing mechanism 4; the worm 5 is engaged with a reversing worm gear 6; a vertical drive shaft 7 is set on the main body 1 connecting to the reversing worm gear 6 at the lower end and connecting to the dough kneading component 2 at the upper end. The worm 5 and reversing worm gear 6 are matched with each other for two-stage reduction while reaching the rotary torque transfer to reverse the direction. The dough kneading machine uses a drive structure in combination with a horizontally-mounted motor 3, a belt reducing mechanism 4 and a worm gear 6, which effectively reduces the height of the main body and decreases the overall volume of the dough kneading machine for easy installation and use; moreover, it avoids the complicated structure of the common-used multi-gear drive and effectively reduces the product cost while keeping the same functions and thus improves the cost performance of the product. Meanwhile, the structure effectively reduces the height of the product, avoiding the safety problem of low stabilization of the common-used dough kneading machine caused by badly shaking during operation due to the over-high base.

The main body 1 includes a base 11 and an upper end cover 12; a reduction gearbox support 13 is set on the bottom of the upper end cover 12; the motor 3, belt reducing mechanism 4 and worm 5 are all mounted in the reduction gearbox support 13, which makes the structure of the product more compact and easier for assembling and maintenance.

Figure 4:
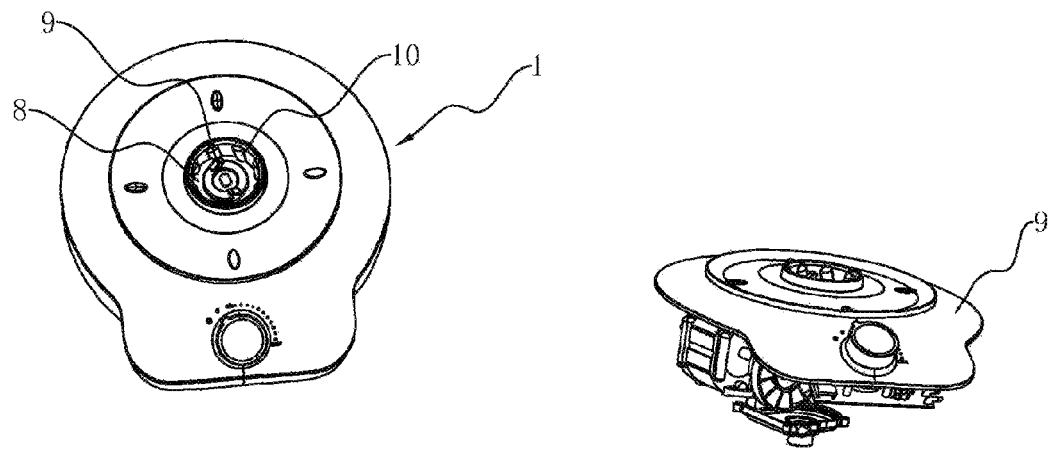
FIG. 4 is a structural diagram of the main body.
Figure 5:
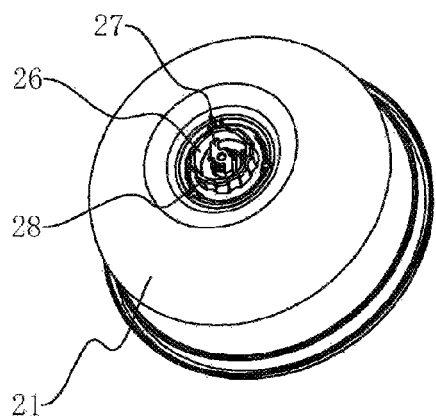
FIG. 5 is a structural diagram of the dough kneading component.

Refer to FIGS. 4 and 5, a first drive shaft 26 is connected to the lower end of the dough kneading drive shaft 23 and a second drive shaft 8 is connected to the upper end of the vertical drive shaft 7; a first drive gear 27 and a second drive gear 9 that are fit to each other are set in the first drive shaft 26 and second drive shaft 8 respectively, so that the effect of large torque drive can be achieved effectively during operation and the drive failure will not be caused due to slipping of the contact surface; an external gear ring 28 is set on the outer side of the first drive shaft 26; an internal gear ring 10 matched with the external gear ring 28 is set on the inner side of the second drive shaft 8, so as to make the installation and removal of the dough kneading component easier.

Figure 6:
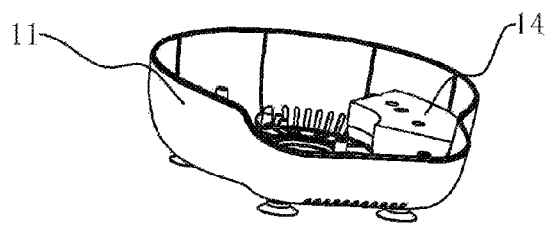
FIG. 6 is a breakdown structure diagram of the main body.

In addition, refer to FIG. 6, a balancing weight 14 is set in the base 11, which adds the weight of the base 11 and largely increases the stability of the product, so that the machine can be steadier and safer during normal operation.

The above-mentioned contents are only the preferred embodiments of the invention. The technical schemes that can realize the purpose of the invention through basically the same way shall be included in the protection scope thereof.

The invention claimed is:

1. A dough kneading machine, comprising a main body (1) on which a dough kneading component (2) is mounted, wherein, the dough kneading component (2) comprises a dough kneading bowl (21) with a cover (22), in which a dough kneading drive shaft (23) is set passing through a mounting hole (24) on the bottom of the bowl (21) and connecting to the main body (1) at the lower end; a bidirectional dough kneading hook (25) with a center shaft (251) is mounted on the upper end of the dough kneading drive shaft (23); the bidirectional dough kneading hook (25) is asymmetric along a length of the center shaft (251); the bidirectional dough kneading hook (25) comprises a first dough kneading hook (252) and a second dough kneading hook (253); the first dough kneading hook (252) and the second dough kneading hook (253) with asymmetric structure are set on two opposite sides of the center shaft (251); and a center scraper (254) is connected to the bottom of the center shaft (251).

2. The dough kneading machine according to claim 1, wherein, a horizontally-mounted motor (3) is set inside the main body (1); a worm (5) is connected to the motor (3) through a belt reducing mechanism (4); the worm (5) is engaged with a reversing worm gear (6); a vertical drive shaft (7) is set on the main body (1), connecting to the reversing worm gear (6) at the lower end and connecting to the dough kneading component (2) at the upper end.

3. The dough kneading machine according to claim 2, wherein, the main body (1) comprises a base (11) and an upper end cover (12); a reduction gearbox support (13) is set on the bottom of the upper end cover (12); the motor (3), belt reducing mechanism (4) and worm (5) are all mounted in the reduction gearbox support (13).

4. The dough kneading machine according to claim 3, wherein, a first drive shaft (26) is connected to the lower end of the dough kneading drive shaft (23) and a second drive shaft (8) is connected to the upper end of the vertical drive shaft (7); a first drive gear (27) and a second drive gear (9) that are fit to each other are set in the first drive shaft (26) and second drive shaft (8) respectively; an external gear ring (28) is set on the outer side of the first drive shaft (26); an internal gear ring (10) matched with the external gear ring (28) is set on the inner side of the second drive shaft (8).

5. The dough kneading machine according to claim 3, wherein, a positioning lug (29) for fitting to the bidirectional dough kneading hook (25) is set on the upper side of the dough kneading drive shaft (23).

6. The dough kneading machine according to claim 3, wherein, the bowl cover (22) has an opening (30) in the middle and a center cover (31) is mounted in the opening (30).

7. The dough kneading machine according to claim 3, wherein, a balancing weight (14) is set in the base (11).

* * * * *